(12) United States Patent
Teplechuk et al.

(10) Patent No.: US 10,897,195 B2
(45) Date of Patent: Jan. 19, 2021

(54) APPARATUS AND METHOD FOR CHARGE PUMP POWER CONVERSION

(71) Applicant: CHAOYANG SEMICONDUCTOR JIANGYIN TECHNOLOGY CO., LTD., Jiangyin (CN)

(72) Inventors: Mykhaylo Teplechuk, San Diego, CA (US); Davide Cartasegna, San Diego, CA (US); Arnaud Toni, San Diego, CA (US); Bertrand Diotte, San Diego, CA (US)

(73) Assignee: Chaoyang Semiconductor Jiangyin Technology Co., Ltd., Jiangyin (CN)

( * ) Notice: Subject to any disclaimer, the term of this patent is extended or adjusted under 35 U.S.C. 154(b) by 0 days.

(21) Appl. No.: 16/570,930

(22) Filed: Sep. 13, 2019

(65) Prior Publication Data

US 2020/0091817 A1    Mar. 19, 2020

Related U.S. Application Data

(60) Provisional application No. 62/731,654, filed on Sep. 14, 2018.

(51) Int. Cl.
*H02M 3/07* (2006.01)
*H02M 3/158* (2006.01)

(52) U.S. Cl.
CPC ............ *H02M 3/07* (2013.01); *H02M 3/158* (2013.01)

(58) Field of Classification Search
CPC ................................ H02M 3/07; H02M 3/158
See application file for complete search history.

(56) References Cited

U.S. PATENT DOCUMENTS

| | | | |
|---|---|---|---|
| 2008/0031023 A1* | 2/2008 | Kitagawa | H02M 3/07 363/59 |
| 2016/0285363 A1 | 9/2016 | Englekirk | |
| 2017/0085189 A1* | 3/2017 | Madsen | H02M 7/5383 |
| 2018/0175741 A1* | 6/2018 | Andersen | H02M 3/1584 |
| 2018/0212521 A1 | 7/2018 | Hsieh et al. | |

FOREIGN PATENT DOCUMENTS

| | | |
|---|---|---|
| JP | 2009-065755 A | 3/2009 |
| JP | 2013-106072 A | 5/2013 |
| KR | 10-2013-0025057 A | 3/2013 |

OTHER PUBLICATIONS

International Search Report on related PCT Application No. PCT/IB2019/057755 from International Searching Authority (KIPO) dated Jan. 15, 2020.
Written Opinion on related PCT Application No. PCT/IB2019/057755 from International Searching Authority (KIPO) dated Jan. 15, 2020.

* cited by examiner

*Primary Examiner* — Jue Zhang
*Assistant Examiner* — Trinh Q Dang
(74) *Attorney, Agent, or Firm* — Klein, O'Neill & Singh, LLP

(57) ABSTRACT

Present invention is an apparatus and method for power conversion charge pumps that uses cross-coupling capacitors. High efficiency power converter charge pump for both divide by 3 (⅓), divide by 3/2 (⅔) are explicitly discussed. The power conversion charge pumps utilizing cross coupled capacitors may provide up to 40% reduction in a number of switches required for a charge pump implementation, thus reducing design area cost while also resulting in high-efficiency performance.

13 Claims, 12 Drawing Sheets

APPARATUS AND METHOD FOR CHARGE PUMP POWER CONVERSION

CROSS REFERENCE TO RELATED APPLICATION

This application claims the benefit of the filing date of U.S. Provisional Patent Application No. 62/731,654, filed on Sep. 14, 2018, the disclosure of which is incorporated by reference herein.

BACKGROUND OF THE INVENTION

The present invention relates generally to power conversion, and more particularly to power conversion charge pumps that achieve discrete/fractional power conversion ratios.

Charge pumps are circuits that primarily use switches and capacitors in combination of series and parallel topologies to achieve certain fixed power conversion ratios, for example to divide, multiply or invert an input voltage. For example, these power conversion ratios can be set to 1(bypass), −1(invert), ½, ⅓, −⅓, ⅔, ¼, ⅕, ⅙ etc. As a typical example, an input voltage of 3V may be present in the system, while for example a CPU load may require a 1V input voltage. In this case a divide by 3 charge pump stage can be employed to provide the 1V output voltage to the CPU load using the 3V input voltage.

A conventional charge pump general schematic diagram is shown in FIG. 1, in which a number of so called flying capacitors are used in order to convert an input voltage to an output voltage with a set of defined discrete conversion ratios. In FIG. 1, a plurality of switching networks are coupled in parallel between an input voltage $V_{in}$ and ground (not shown), which may be $V_{ss}$. For ease of illustration, only two switching networks, switching network 1 and switching network N, are shown in FIG. 1. The switching networks are also coupled to a load. Each switching network includes at least one flying capacitors. In FIG. 1, each switching network includes two flying capacitors, with switching network 1 having flying capacitors Cfly1-1 and Cfly2-1 and switching network N having flying capacitors Cfly1-N and Cfly2-N. The flying capacitors may be coupled to $V_{in}$, the load, and ground in various arrangements, depending on operation of the switches of the switching networks. The switching networks variously couple the flying capacitors based on one or more clock signals. In most embodiments the clock signals are of the same frequency, but differ in phase. FIG. 1 demonstrates that a number of charge-pumps can be paralleled. These charge pumps can be clocked from a set of in-phase (clock on identical rising edges) or out-of-phase (rising and falling edges) clock/control signals. It should be understood that there are a variety of choices available to control these paralleled charge pumps in order to achieve particular design goals, for example to maximize circuit performances.

BRIEF SUMMARY OF THE INVENTION

Aspects of the invention provide power conversion charge pumps which utilize cross coupling capacitors to couple switching networks of the charge pumps. In some embodiments the switching networks have identical topologies, but use different clock signals for operating corresponding switches of the switching networks. In some embodiments the switching networks include flying capacitors. In some embodiments the cross coupling capacitors are coupled directly to flying capacitors of at least one switching network. In some embodiments the cross coupling capacitors are coupled directly to switches of at least one switching network.

Some aspects provide a power conversion charge pump, comprising: a first switching network having a first plurality of switches and at least one first flying capacitor, the first switching network coupled between a voltage input and a lower voltage; a second switching network having a second plurality of switches and at least one second flying capacitor, the second switching network coupled between the voltage input and the lower voltage; and at least two cross-coupling capacitors, the cross-coupling capacitors coupling the first switching network and the second switching network; with the first switching network and the second switching network each coupled to a load; with switches of the first switching network and switches of the second switching network configured to couple the at least one first flying capacitor, the at least one second flying capacitor, and the two cross-coupling capacitors in a plurality of configurations with respect to the voltage input, the lower voltage, and the load. In some such aspects the first switching network and the second switching network each comprise a power conversion divider. In some such aspects the first switching network and the second switching network have a same number of switches. In some such aspects the first switching network and the second switching network have a same number of flying capacitors. In some such aspects the first switching network and the second switching network have identical circuit topologies. In some such aspects the first switching network and the second switching network are configured such that corresponding switches of the first switching network and the second switching network are operated by different clock signals. In some such aspects the different clock signals are clock signals having a same frequency but differing in phase. In some such aspects the different clock signals are 180 degrees out of phase. In some such aspects the cross-coupling capacitors are coupled in parallel. In some such aspects a first of the cross-coupling capacitors is coupled in series with a flying capacitor of the at least one second flying capacitors with no intervening switches and a second of the cross-coupling capacitors is coupled in series with a flying capacitor of the at least one first flying capacitors with no intervening switches. In some such aspects a first of the cross-coupling capacitors is coupled in series with a flying capacitor of the at least one second flying capacitors with at least one intervening switch and a second of the cross-coupling capacitors is coupled in series with a flying capacitor of the at least one first flying capacitors with at least one intervening switch. In some such aspects the lower voltage is ground.

Some aspects further comprise at least one further switching network having a further plurality of switches and at least one further flying capacitor, the further switching network coupled between the voltage input and the lower voltage; and at least one further cross-coupled capacitor; with the further switching network coupled to the load; with switches of the further switching network configured to couple the at least one further flying capacitor, and the at least one further cross-coupling capacitor in a plurality of configurations with respect to the voltage input, the lower voltage, and the load.

These and other aspects of the invention are more fully comprehended upon review of this disclosure.

DETAILED DESCRIPTION

Figure 1:
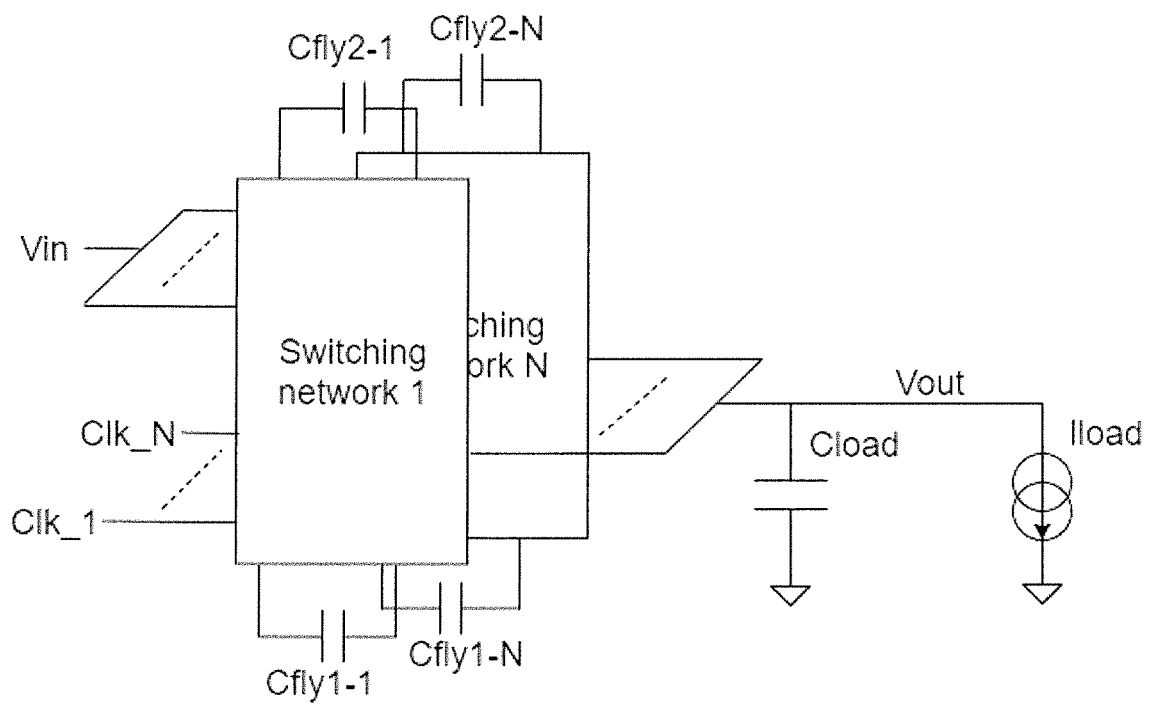
FIG. 1 illustrates a conventional general block diagram of an N instance charge pump.
Figure 2:
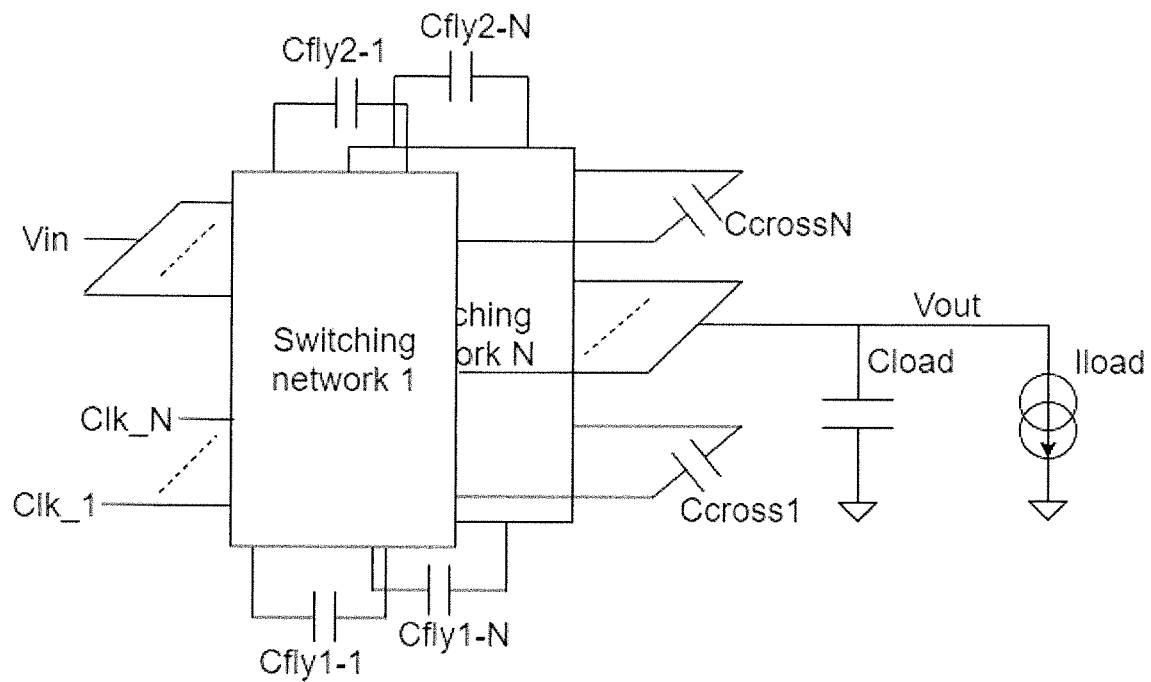
FIG. 2 illustrates a general block diagram of an N instance charge pump with cross-coupled capacitors in accordance with aspects of the invention.

A general schematic block diagram of a power conversion charge pump with cross-coupled capacitors is shown in FIG. 2. In FIG. 2 a number of N cross coupling capacitors are used to cross-couple individual parallel instances of N switching networks. In some embodiments N may be any integer number greater than 1. For ease of illustration, FIG. 2 explicitly shows a switching network 1 and a switching network N, along with cross coupling capacitors Ccross1 and CcrossN. The N switching networks are coupled in parallel between an input voltage and ground (not shown) or $V_{ss}$. The switching networks are also coupled to a load, with each switching network including at least one flying capacitors. In FIG. 2, each switching network includes two flying capacitors, with switching network 1 having flying capacitors Cfly1-1 and Cfly2-1 and switching network N having flying capacitors Cfly1-N and Cfly2-N. The switching networks variously couple the flying capacitors and cross coupling capacitors to $V_{in}$, ground, and the load in various arrangements based on one or more clock signals. In some embodiments each switching network receives its own clock signal, with for example FIG. 2 showing a clock signal Clk_1 provided to switching network 1 and clock signal Clk_N provided to switching network N. In some embodiments each clock signal is of a same frequency, with the clock signals differing in phase. The N switching networks and cross coupling capacitors convert an input voltage $V_{in}$ to an output voltage $V_{out}$ at a fixed conversion ratio of $V_{out}/V_{in}$. The output voltage $V_{out}$ is used to provide power to a load.

Figure 3:
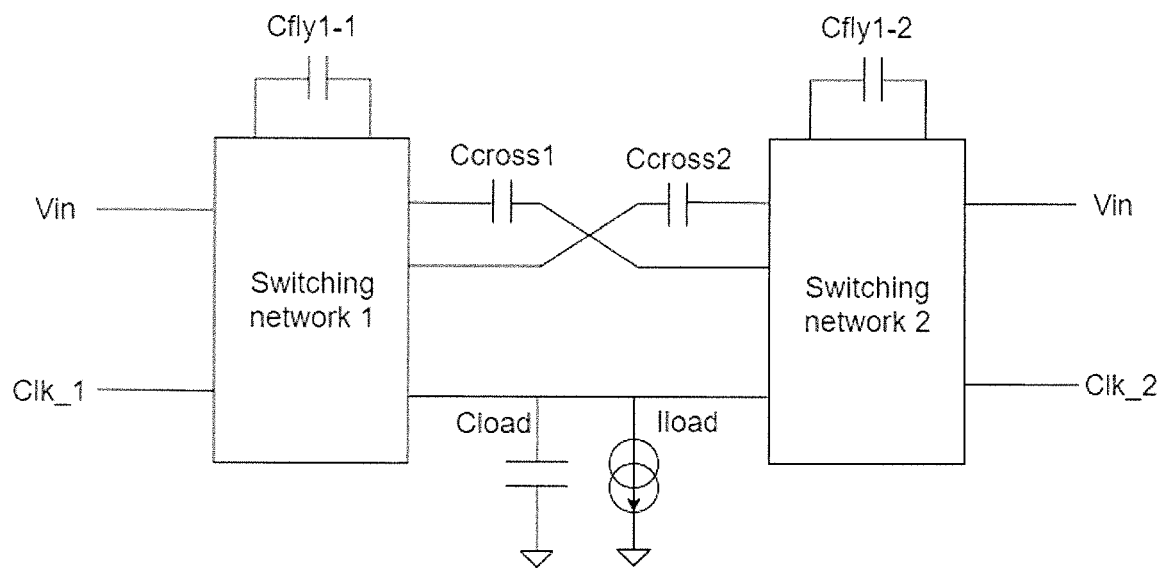
FIG. 3 illustrates a simplified example demonstrating a two instance charge pump with two flying capacitors and two cross coupled capacitors in accordance with aspects of the invention.

A simplified schematic of an example power conversion charge pump with cross-coupled capacitors is shown in FIG. 3. The charge pump of FIG. 3 has only two parallel switching networks, switching network 1 and switching network 2, and two flying capacitors, Cfly1-1 and Cfly1-2. An input voltage $V_{in}$ is provided to each of the switching networks. The capacitor Cfly1-1 is coupled to the switching network 1, and the capacitor Cfly1-2 is coupled to the switching network 2. The switching networks are each coupled to a load. A capacitor Cload is shown as being in parallel to the load. Switches of the switching networks operate based on clock signals, with a first clock signal Clk_1 used by the first switching network and a second clock signal Clk_2 used by the second switching network, although in various embodiments both switching network 1 and switching network 2 may both utilize both clock signals. In various embodiments the first clock signal and the second clock signal may be of the same frequency but 180 degrees out of phase. Two cross-coupling capacitors, Ccross1 and Ccross2, couple the switching networks. The cross coupling capacitors are arranged in parallel in the example of FIG. 3.

Figure 4:
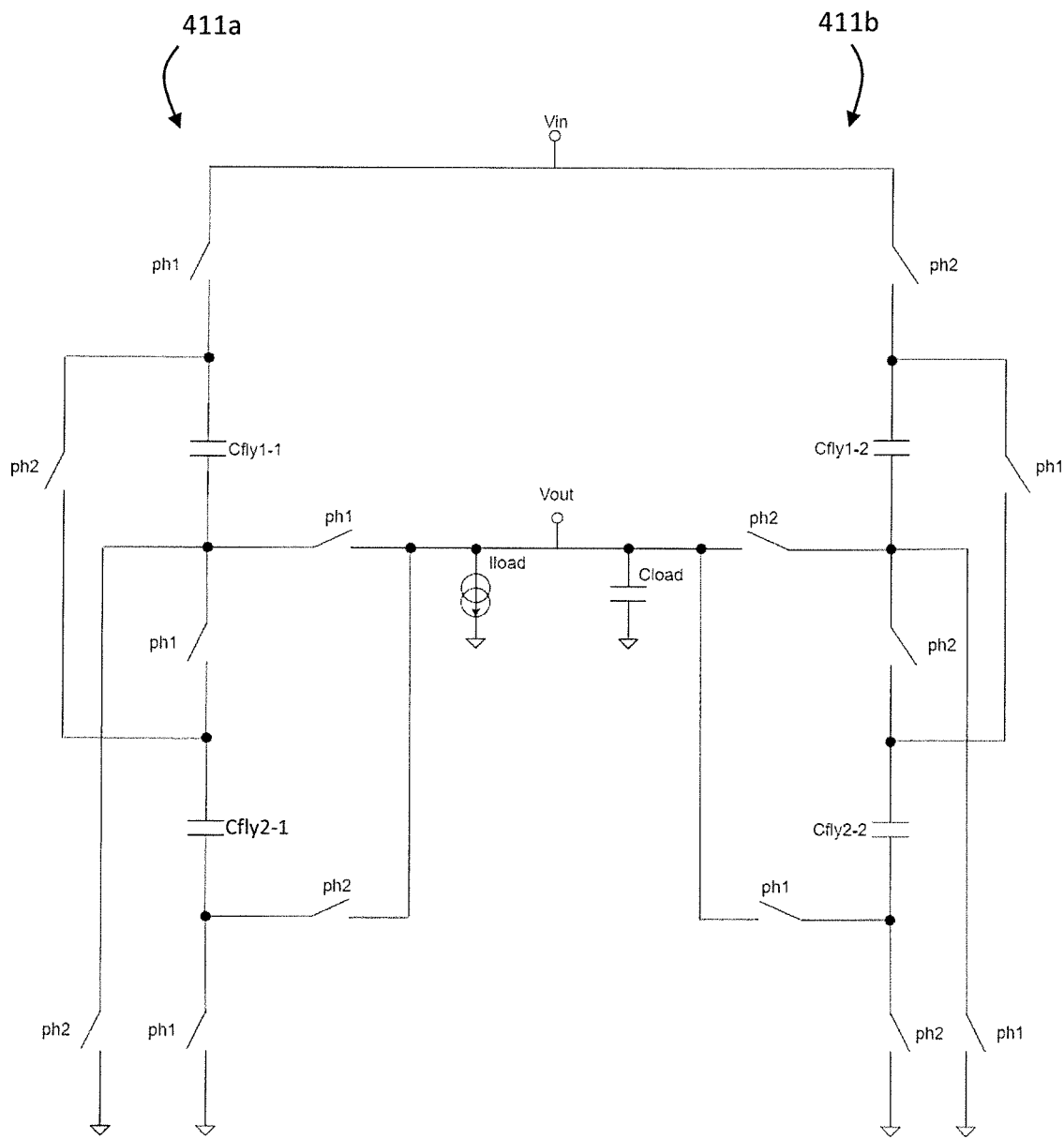
FIG. 4 illustrates an example of a conventional charge pump generating an output voltage Vin*⅓.
Figure 5:
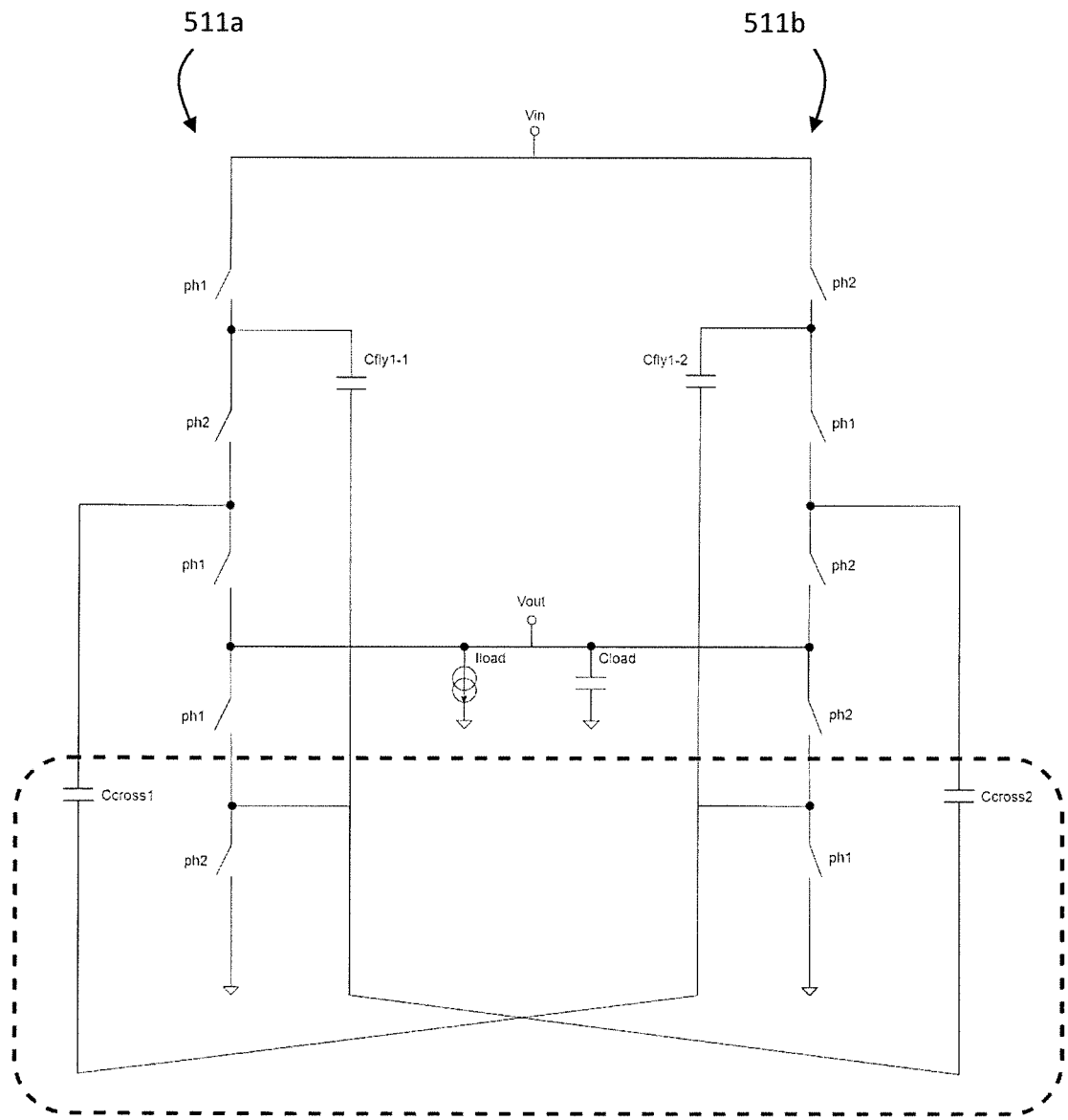
FIG. 5 illustrates an example of a charge pump generating an output voltage Vin*⅓ by employing cross coupled (flying) capacitors in accordance with aspects of the invention.
Figure 7:
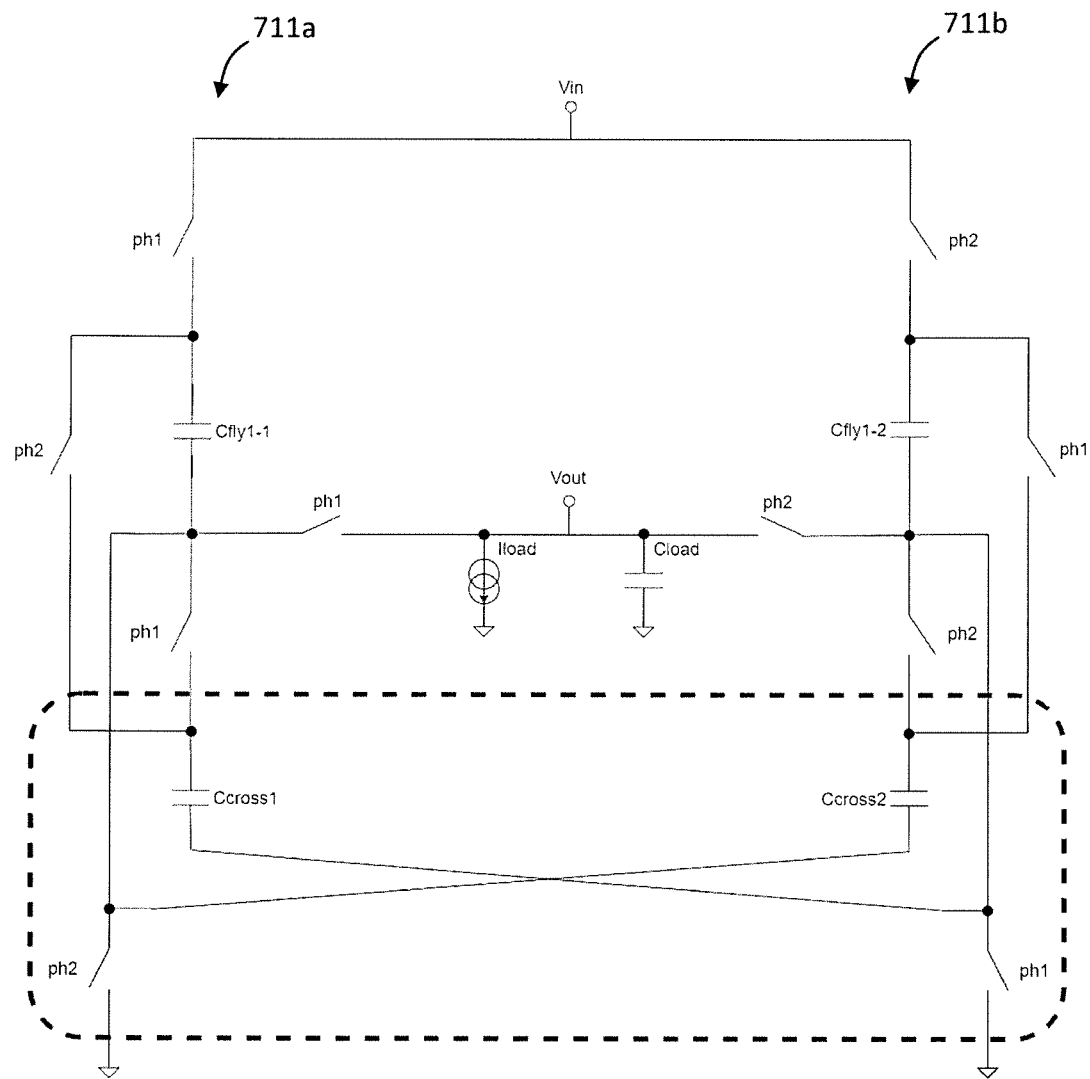
FIG. 7 illustrates an example of another/alternative realization of a charge pump generating an output voltage Vin*⅓ by employing cross coupled (flying) capacitors in accordance with aspects of the invention.

A conventional solution for a divide by 3 power conversion charge-pump may use a circuit depicted in FIG. 4, with two different examples of ⅓ power conversion dividers in accordance with aspects of the invention illustrated in FIGS. 5 and 7. FIG. 4 has two similar divider circuits, 411a and 411b, one on each side of $V_{in}$ and $V_{out}$, as illustrated. Each divider circuit includes two flying capacitors which may be coupled to $V_{in}$, ground, and the load in various configurations depending on operation of switches of each divider. The dividers comprise essentially two dividers by three. The switches of the dividers operate using clock phases ph1 and ph2, which may be considered to be 180 degrees out of phase in some embodiments. The implementation of FIG. 4 uses at least seven switches per side, bringing a total number of switches used to fourteen.

The embodiments of FIGS. 5 and 7 both use an interleaved structure utilizing cross coupling flying capacitors. The embodiments of FIGS. 5 and 7 each include two similar divider circuits 511a,b and 711a,b, respectively, with the divider circuits coupled by cross coupling flying capacitors Ccross1 and Ccross2. The divider circuitry may be considered to have identical circuit topologies, with for example numbers and circuit positions of switches and flying capacitors of the divider circuitry being the same. Corresponding switches of the divider circuits, however, are operated using different clock signals. The use of the cross coupling flying capacitors allows for a reduction in number of switches, for example compared to the circuit of FIG. 4. The interleaved structure using cross coupling flying capacitors may also achieve high power efficiency and reduce switch size, switching frequency, and in some embodiments number of capacitors while achieving, for example a desired ⅓ power conversion ratio.

The embodiment of FIG. 5 shows an example implementation of ⅓ divider/multiplier in accordance with aspects of the invention. For FIG. 5, the same division ratio of three of the circuit of FIG. 4 is achieved, with a reduced number of switches. The example circuit of FIG. 5 shows a total of ten switches. The reduction in number of switches allows for improved charge pump performance and reduced size. In FIG. 5 a first set of switches and a first flying capacitor Cfly1-1 is coupled to a second set of switches and a second flying capacitor Cfly1-2 by a first cross coupling capacitor Ccross1 and a second cross coupling capacitor Ccross2. The switches operate based on a first clock signal with a first phase ph1, and a second clock signal with a second phase ph2, different than the first phase, with both clock signals having the same frequency. In most embodiments the phases are out of phase by 180 degrees. In addition, although FIG. 5 (and other figures) may only show two cross coupling capacitors, in various embodiments more than two cross coupling capacitors may be used.

Figure 6:
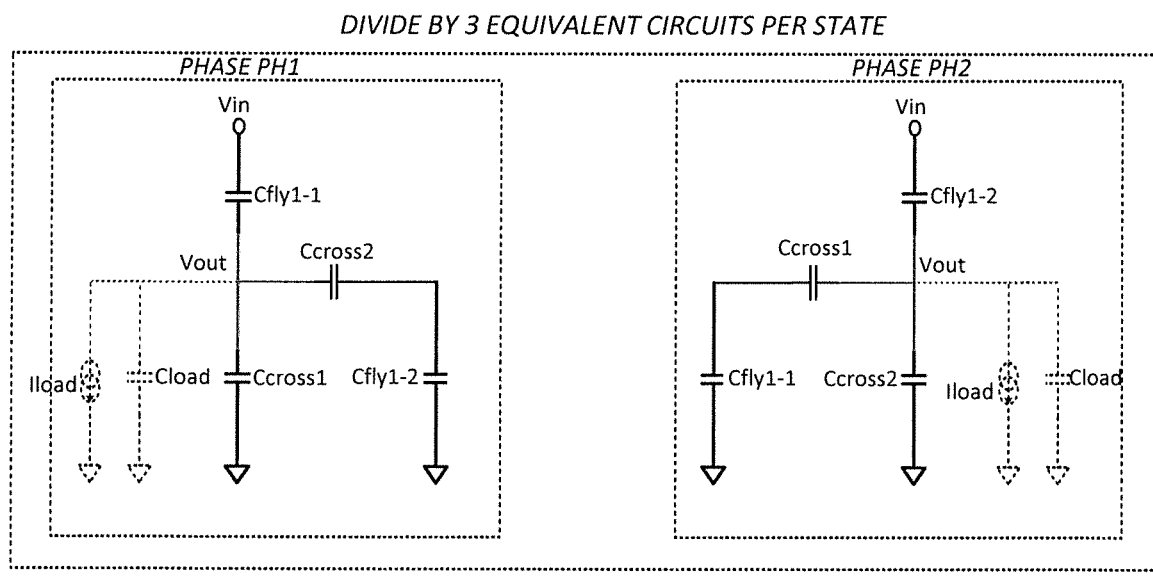
FIG. 6 illustrates circuit states of the charge pump of FIG. 5.

To simplify understanding, FIG. 6 is a diagram demonstrating capacitor configuration or state (excluding switches) for both phases ph1 and ph2 of the embodiment of FIG. 5. As may be seen on FIG. 6, with ph1 switches closed, Cfly1-1 is between $V_{in}$ and $V_{out}$, Ccross1 is between $V_{out}$ and ground, and Ccross2 and Cfly1-2 are in series between $V_{out}$ and ground. As also may be seen in FIG. 6, with ph2 switches closed, Cfly1-2 is between $V_{in}$ and $V_{out}$, Ccross2 is between $V_{out}$ and ground, and Ccross1 and Cfly1-1 are in series between $V_{out}$ and ground. From both FIG. 5 and the capacitor state diagram of FIG. 6, the reduction of a number of switches is due to use of cross coupling capacitors to couple as an example, two sides of a conventional implementation. In some embodiments, and as illustrated in FIG. 5, a cross-coupling capacitor is in series with a flying capacitor, with no intervening switches. Although in the example of FIGS. 5 and 6, two phases are used, it is a common practice in charge pump design to use more than two phases (for example three, four etc.), and in various embodiments more phases (states in which circuit is present) may be used in accordance with aspects of the present invention. Examples with two phases, and also two cross coupling capacitors, are shown here only to provide a simpler to understand example, without undue complexity.

Figure 8:
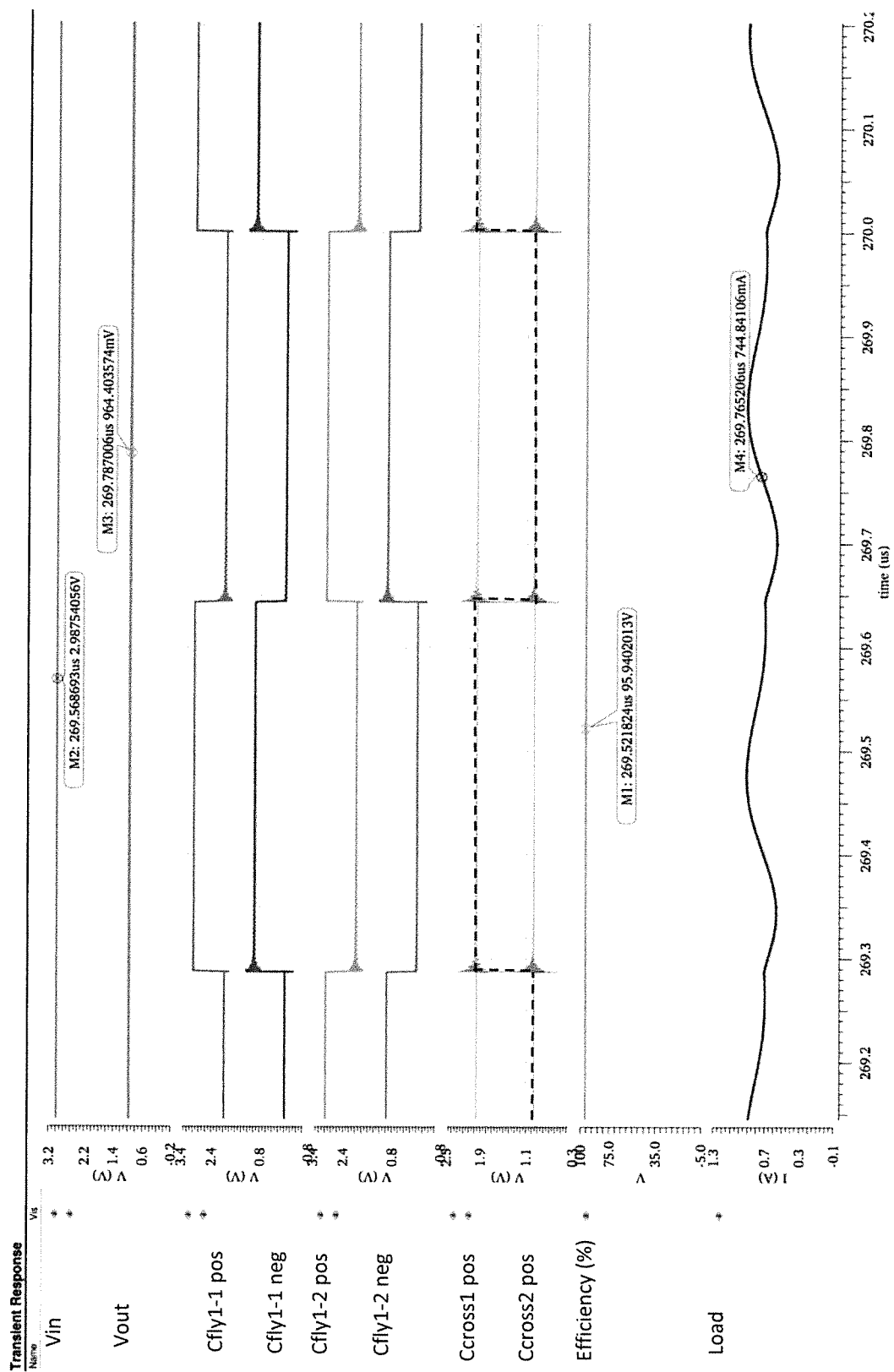
FIG. 8 illustrates simulation results for the ⅓ charge pump of FIG. 5.

Circuit simulation results for the ⅓ charge pump of FIG. 5 are demonstrated in FIG. 8. In FIG. 8 it can be seen that the charge pump, with 96% efficiency, converts an input voltage of 3V into a 1V output voltage while providing an output load current of 750 mA. Voltages on positive and negative terminals for the flying capacitors are also shown, as are voltages for positive terminals of the cross-coupling capacitors. It can be observed that both positive terminals of both flying capacitors Cfly1-1 and Cfly1-2 are switching between VDD and VDD−VDD*⅓ (3V and 2V) voltage while negative terminals of these capacitors switch between VDD*⅓ (1V) and GND. At the same time cross-coupling capacitors are switching between VDD−VDD*⅓ and VDD*⅓ (e.g. 2V and 1V).

FIG. 7 is a schematic of another example of a power conversion charge pump with cross coupling capacitors having a ⅓ $V_{in}$ to $\backslash T_{out}$ ratio. In FIG. 7, a first switching network 711a is coupled between $V_{in}$ and ground (or $V_{ss}$) by switches operated based on first and second clock signals ph1, ph2 differing in phase. The first switching network includes a first flying capacitor Cfly1-1 (and more flying capacitors in various embodiments), and has an output coupled to a load. Similarly, a second switching network 711b is coupled between $V_{in}$ and ground (or $V_{ss}$) by switches operated based on the first and second clock signals of the same frequency, but differing in phase, for example by 180 degrees. The second switching network includes a second flying capacitor Cfly2-1 (and more flying capacitors in various embodiments), and also has an output coupled to the load.

The first and second switching networks are also coupled by a pair of cross coupling capacitors Ccross1, Ccross2. In various embodiments the first and second switching networks may be coupled by additional cross coupling capacitors. In the embodiments of FIG. 7, switches are interposed between the cross coupling capacitors and the flying capacitors.

Figure 9:
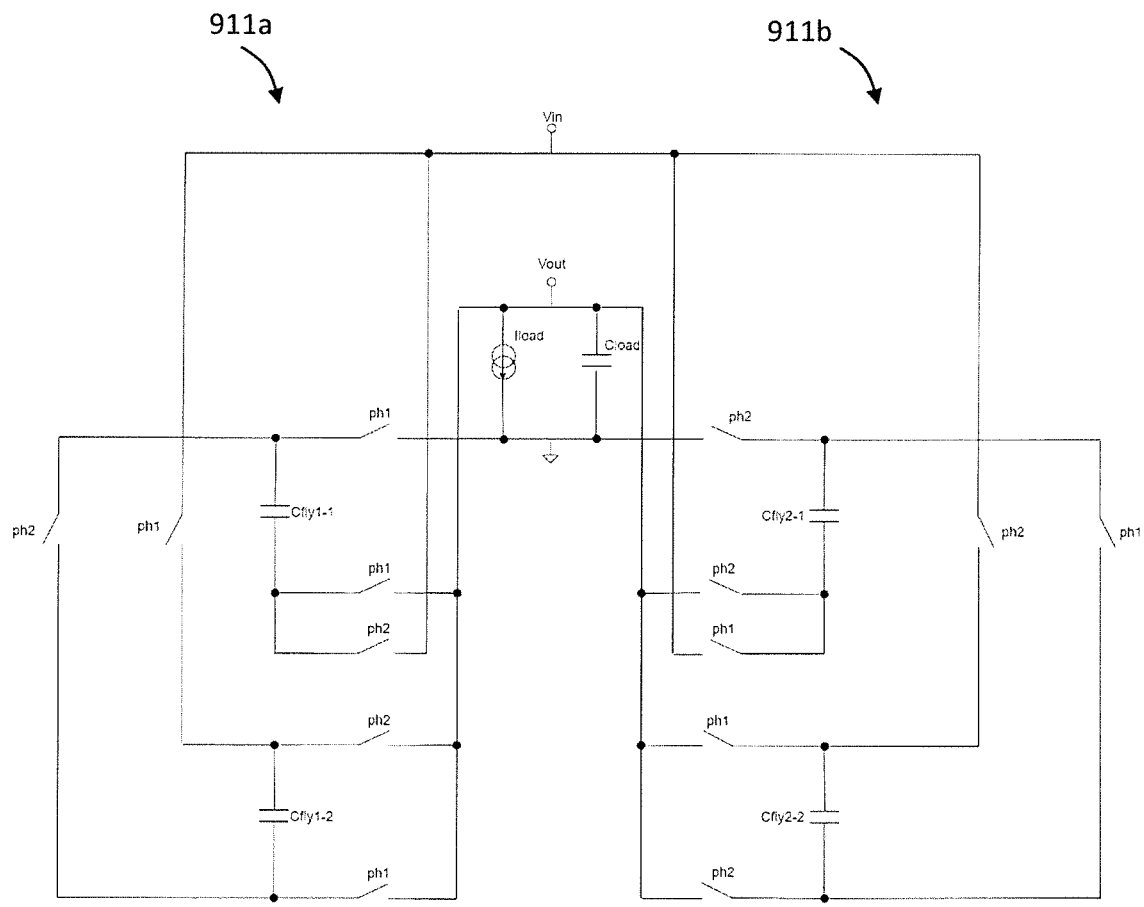
FIG. 9 illustrates an example of a conventional realization of a charge pump generating an output voltage Vin*⅔.

FIG. 9 is a schematic of an example conventional implementation of a power conversion charge pump having a ⅔ $V_{in}$ to $V_{out}$ ratio. The example of FIG. 9 includes a first switching network 911a with flying capacitors in parallel to a second switching network 911b with flying capacitors. Switches of the first and second switching networks operate based on first and second clock signals, of the same frequency but which differ in phase, for example by 180 degrees. The circuit topology of the first and second switching networks is identical, except that corresponding switches of the two switching networks are operated with different ones of the first and second clock signals. The example charge pump of FIG. 9 utilizes at least 14 switches.

Figure 10:
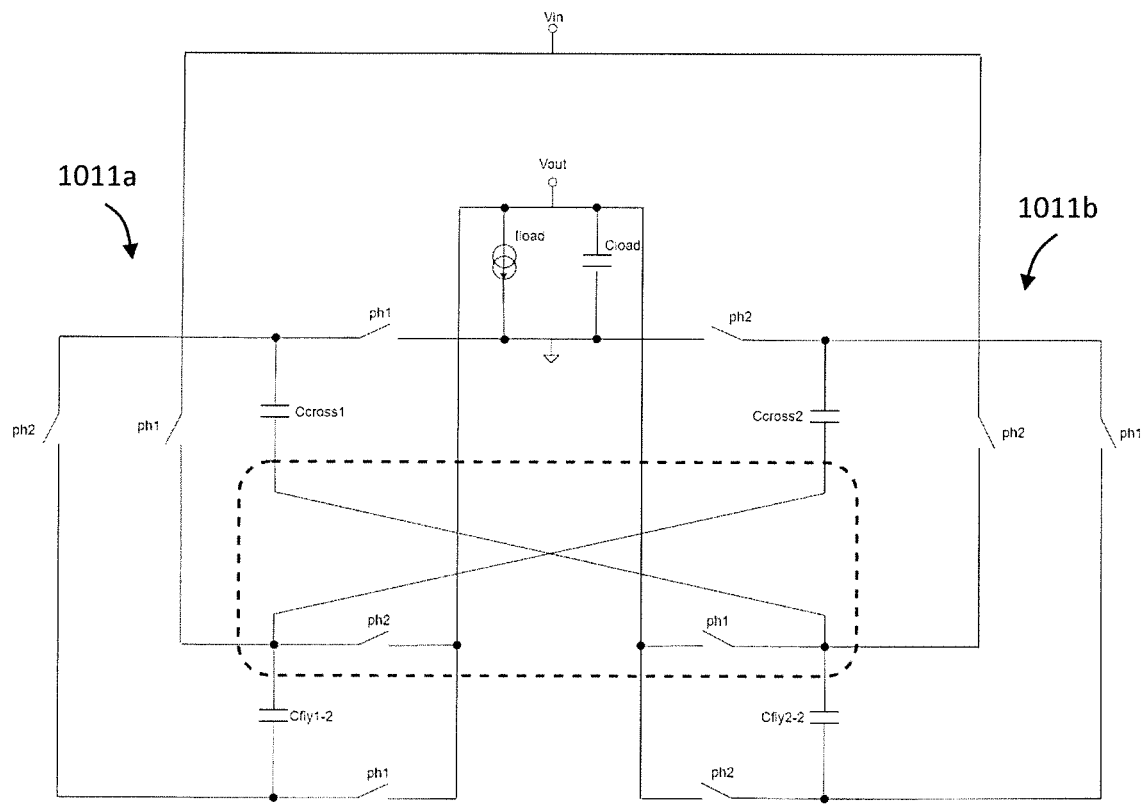
FIG. 10 illustrates an example of a charge pump generating output voltage Vin*⅔ by employing cross coupled (flying) capacitors in accordance with aspects of the invention.

FIG. 10 is a schematic of an example implementation of a power conversion charge pump having a ⅔ $V_{in}$ to $V_{out}$ ratio, with cross coupled capacitors Ccross1, Ccross2 in accordance with aspects of the invention. From FIG. 10, it may be seen that the charge pump may use 10 switches, substantially fewer switches than the charge pump of FIG. 9. The charge pump of FIG. 10 includes a first switching network 1011a and a second switching network 1011b, both including a flying capacitor Cfly1-2 and Cfly2-2, respectively, and both coupled between $V_{in}$ and ground (or $V_{ss}$). Each of the switching networks also has an output coupled to $V_{out}$. Operation of switches of the switching networks is based on a first clock signal ph1 and a second clock signal ph2, of the same frequency but which differ in phase. In the embodiment of FIG. 10, two clock signals are used, which differ in phase by 180 degrees. In various embodiments additional clock signals may be used as well. Circuit topology of the first switching network and the second switching network is the same, except that corresponding switches of the two switching networks operate using different ones of the clock signals.

The switching networks are coupled by a pair of cross coupling capacitors Ccross1, Ccross2. In the embodiment of FIG. 10, the cross coupling capacitor are each coupled to a pair of switches in one switching network, and a pair of switches and the flying capacitor of the other switching network.

Figure 11:
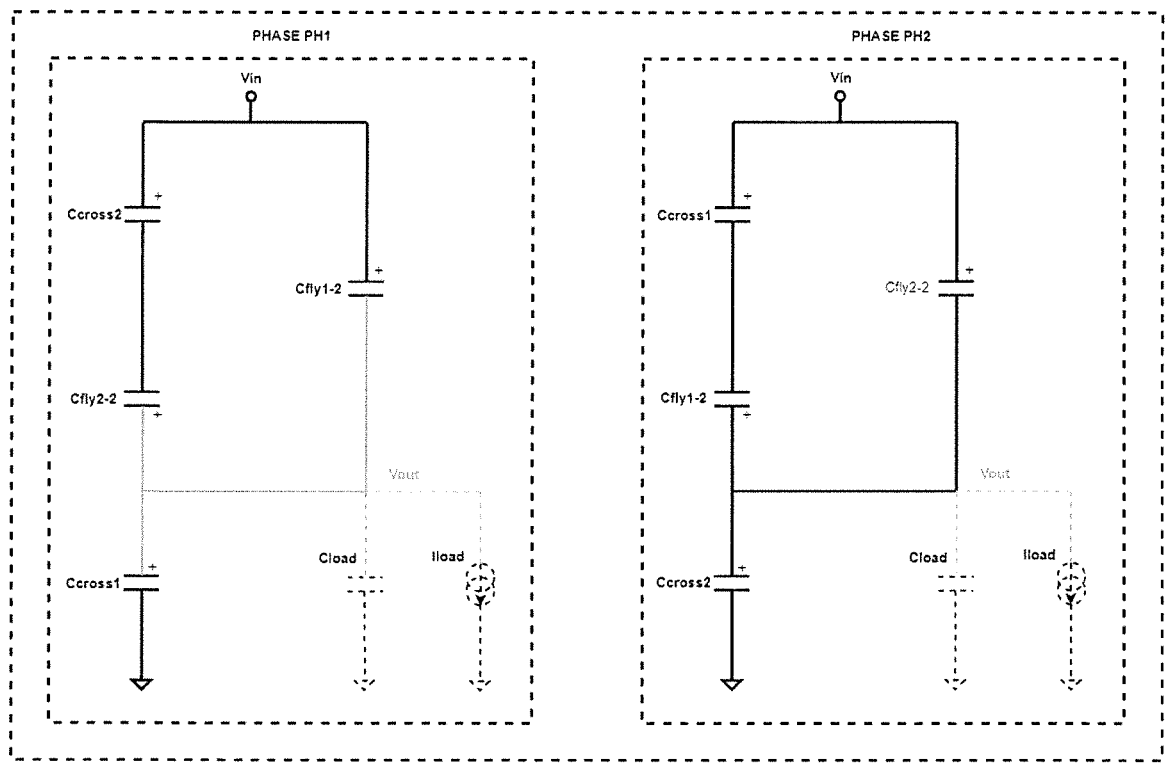
FIG. 11 illustrates an example of circuit states of the charge pump of FIG. 10.

FIG. 11 is a diagram demonstrating capacitor configuration, excluding switches, of the charge pump of FIG. 10 for situations when switches controlled by the first clock signal are closed, ph1, and situations when switches controlled by the second clock signal are closed, ph2. As may be seen on FIG. 11, with ph1 switches closed, Cfly1-2 is between $V_{in}$ and $V_{out}$, Ccross1 is between $V_{out}$ and ground, and Ccross2 and Cfly2-2 are in series between $V_{in}$ and ground. As also may be seen in FIG. 11, with ph2 switches closed, Cfly2-2 is between $V_{in}$ and $V_{out}$, Ccross2 is between $V_{out}$ and ground, and Ccross1 and Cfly1-2 are in series between $V_{in}$ and ground.

Figure 12:
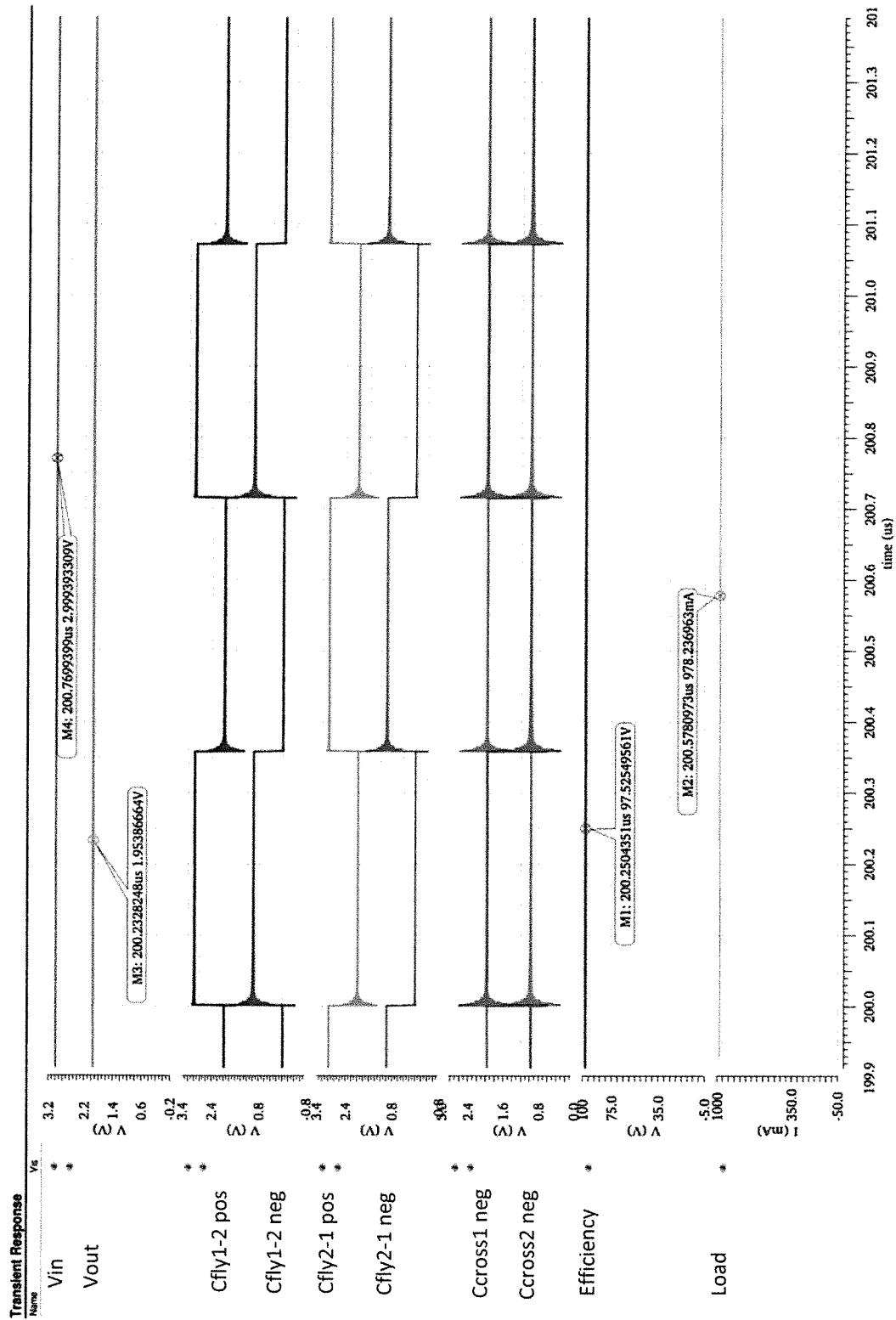
FIG. 12 illustrates simulation results for the ⅔ charge pump of FIG. 11.

Circuit simulation results for the ⅔ Charge pump of FIG. 10 are demonstrated in FIG. 12. In FIG. 12 it can be seen that the charge pump with efficiency well exceeding 97% converts an input voltage of 3V into a 2V output voltage while providing an output load current of approximately 1 A. Voltages on positive and negative terminals for both flying and cross-coupling capacitors are also shown. Similar to the ⅓ mode charge pump, it can be observed that both positive terminals of both flying capacitors Cfly1-1 and Cfly1-2 are switching between VDD and VDD*⅔ (3V and 2V) voltage while negative terminals of these capacitors switch between VDD*⅓ (1V) and GND. At the same time cross-coupling capacitors are switching between VDD*⅔ and VDD*⅓ (or 2V and 1V). And the output is achieving the desired ⅔*VDD conversion ratio with a very high efficiency.

Although the invention has been discussed with respect to various embodiments, it should be recognized that the invention comprises the novel and non-obvious claims supported by this disclosure.

What is claimed is:

1. A power conversion charge pump, comprising:
   a first switching network having a first plurality of switches and at least one first flying capacitor, the first switching network coupled between a voltage input and a lower voltage;
   a second switching network having a second plurality of switches and at least one second flying capacitor, the second switching network coupled between the voltage input and the lower voltage; and
   at least two cross-coupling capacitors, the cross-coupling capacitors coupling the first switching network and the second switching network;
      with the first switching network and the second switching network each coupled to a load;
      with switches of the first switching network and switches of the second switching network configured to couple the at least one first flying capacitor, the at least one second flying capacitor, and the two cross-coupling capacitors in a plurality of configurations with respect to the voltage input, the lower voltage, and the load.

2. The power conversion charge pump of claim 1, wherein the first switching network and the second switching network each comprise a power conversion divider.

3. The power conversion charge pump of claim 1, wherein the first switching network and the second switching network have a same number of switches.

4. The power conversion charge pump of claim 1, wherein the first switching network and the second switching network have identical circuit topologies.

5. The power conversion charge pump of claim 1, wherein the cross-coupling capacitors are coupled in parallel.

6. The power conversion charge pump of claim 1, wherein a first of the cross-coupling capacitors is coupled in series with a flying capacitor of the at least one second flying capacitors with no intervening switches and a second of the cross-coupling capacitors is coupled in series with a flying capacitor of the at least one first flying capacitors with no intervening switches.

7. The power conversion charge pump of claim 1, wherein a first of the cross-coupling capacitors is coupled in series with a flying capacitor of the at least one second flying capacitors with at least one intervening switch and a second of the cross-coupling capacitors is coupled in series with a flying capacitor of the at least one first flying capacitors with at least one intervening switch.

8. The power conversion charge pump of claim 1, further comprising:
   at least one further switching network having a further plurality of switches and at least one further flying capacitor, the further switching network coupled between the voltage input and the lower voltage; and
   at least one further cross-coupled capacitor;
      with the further switching network coupled to the load;
      with switches of the further switching network configured to couple the at least one further flying capacitor, and the at least one further cross-coupling capacitor in a plurality of configurations with respect to the voltage input, the lower voltage, and the load.

9. The power conversion charge pump of claim 1, wherein the lower voltage is ground.

10. The power conversion charge pump of claim 3, wherein the first switching network and the second switching network have a same number of flying capacitors.

11. The power conversion charge pump of claim 4, wherein the first switching network and the second switching network are configured such that corresponding switches of the first switching network and the second switching network are operated by different clock signals.

12. The power conversion charge pump of claim 11, wherein the different clock signals are clock signals having a same frequency but differing in phase.

13. The power conversion charge pump of claim 12, wherein the different clock signals are 180 degrees out of phase.

* * * * *

UNITED STATES PATENT AND TRADEMARK OFFICE
CERTIFICATE OF CORRECTION

PATENT NO. : 10,897,195 B2
APPLICATION NO. : 16/570930
DATED : January 19, 2021
INVENTOR(S) : Mykhaylo Teplechuk et al.

Page 1 of 1

It is certified that error appears in the above-identified patent and that said Letters Patent is hereby corrected as shown below:

In the Specification

• In Column 1, Line 23, after "1/2," insert -- -1/2, --.

• In Column 4, Line 23, delete "$V_{in}$" and insert -- $V_{in}$, --, therefor.

• In Column 5, Line 41, delete "\T$_{out}$" and insert -- $V_{out}$ --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*